Patented Nov. 23, 1937

2,100,085

UNITED STATES PATENT OFFICE 2,100,085

PRODUCTION OF VULCANIZED RUBBER

Henry O. Newman, Waterbury, Conn., assignor, by mesne assignments, to United States Rubber Company, New York, N. Y., a corporation of New Jersey No Drawing. Application January 5, 1932, Serial No. 584,893

13 Claims. (Cl. 18—53)

This invention relates to improvements in the production of vulcanized rubber articles.

An object of this invention is to provide a process which will remove hazards of premature vulcanization or "scorching" of rubber mixes during preliminary treatment, such as milling, calendering, extruding, etc. prior to intentional or final vulcanization thereof,—and yet not adversely interfere with the rate of cure at the subsequent vulcanizing temperatures, for the production of satisfactory vulcanizates. A further object is to control the use of basic organic amines when they are intended to be used to "activate" other organic accelerators. Frequently normally strong accelerators when activated with basic amines resemble ultra-rapid accelerators in activity and are practically impossible to handle in the average factory. A further object of this invention is, therefore, to provide a method of controlling such extremely active combinations of accelerators during preliminary processing without retarding the rate of cure sufficiently at elevated vulcanizing temperatures to be uneconomic or impractical.

Certain accelerators of vulcanization of rubber are known to be rendered considerably more active by the presence of basic organic amines. These basic amines may so activate a very weak accelerator that it becomes a strong accelerator or may activate a normally strong accelerator so that the amount of this strong accelerator may be substantially reduced and still produce strong acceleration. This activation is far greater in effect than would normally be expected under simple summation or additive effects. Unfortunately, such activation is frequently accompanied by a lowering of the critical temperature of vulcanization, and as a consequence, shows a marked tendency for premature vulcanization during preliminary processing of the rubber mixes prior to vulcanization. Scorching hazards are reflected not only in inferior rubber products but, frequently, in complete paralysis of the manufacturing processes and units.

The basic organic amines when blended with an accelerator susceptible to activation thereby do not avoid scorching during the preliminary operations, while the local use of acids as such, to reduce scorching produces permanent retardation in the rate of cure during final vulcanization and also gives to the rubber bad ageing properties. The present invention provides a way of maintaining the benefits and avoiding the disadvantages of using activating basic organic amines in conjunction with organic accelerators capable of being activated, and also avoids the undesirable features of using acids locally on the mill. Accelerators capable of being activated by basic organic amines are well known and include certain dithiocarbamates, aldehyde-amines, thiazoles, thiuramsulphides, xanthogenates, etc.

It has been found that when a basic organic amine such as diphenylguanidine, diorthotolylguanidine, phenylorthotolylguanidine, etc. is reacted with an acid to form a substantially neutral salt of the amine and the salt mixed with the rubber on the mill, together with the activatable accelerator,—that the scorching effect is substantially eliminated. A number of activating basic amines have already been disclosed by Scott U. S. P. 1,732,486.

The acid chosen may be any acid which will fulfill the purposes of producing a substantially neutral salt and which acid has an acidity substantially equal to that of acetic, formic, or oxalic acid, and preferably should be an acid like acetic or formic acid, that is an acid volatile at final vulcanization temperatures. Because of this latter innate characteristic, the weak organic acid will tend to remove itself from the rubber and thereby advance the activating influence of the amine component. If the acid chosen is too strong or too weak, or used in insufficient or excessive amounts, the salt produced reflects the properties of marked acidity or alkalinity as shown by using litmus as an indicator in an aqueous solution of the salt. The substantially neutral amine salts produced from these types of acids decompose or are rendered active at the subsequent curing temperatures and activate the accelerator, in spite of the acid component, in a manner similar to the activation of the accelerators by the basic organic amines per se, to produce faster cures and vulcanizates having good ageing properties.

The following description and examples in which the parts are by weight further illustrate the invention. In these examples the basic amine such as diphenylguanidine etc. is treated with molecular equivalents of the organic acid to form a substantially neutral salt, e. g. diphenylguanidine-acetate etc. Various methods may be used for treating the basic amines with the desired acid, depending on the physical properties of the components in such a system. For example if the acid is normally a liquid it may be added directly. Acids which are soluble in water may be added in aqueous solution. In many cases a mutual solvent, such as alcohol, provides a convenient method of reacting the acid with the basic amine. Again the desired condition may be attained by adding the acid slowly to the basic amine until an aqueous solution of the salt reacts substantially neutral to litmus. The salt may be mixed with the accelerator to be activated and then the mixture of the two materials added to the rubber or the two materials may be added separately to the rubber on the mill.

*Example 1.*—A rubber stock was compounded in the usual manner, said rubber stock comprising 100 parts rubber (smoked sheet), 6 parts of zinc oxide, 40 parts of blanc fixe, 2.25 parts of sulphur, 0.5 part of stearic acid, 0.5 part of 2,1-dinitrophenyl ester of mercaptobenzothiazole (2,4-dinitrophenyl benzothiazyl sulphide), and 0.75 part of diphenylguanidine, to form sample A. Samples B and C were prepared in a similar manner except that instead of using 0.75 part of diphenylguanidine, 0.965 part of diphenylguanidine acetate was substituted therefor in preparing sample B,—and 0.915 part of diphenylguanidine-formate was substituted therefor in preparing sample C. Samples A, B and C were cured at 60 lbs. steam pressure per sq. in. during various time intervals and the tensile-elongation properties were as follows: T is tensiles in pounds per square inch at break and E is percentage elongation.

| Cure interval | A | | B | | C | |
|---|---|---|---|---|---|---|
| | T | E | T | E | T | E |
| Minutes | | | | | | |
| 7 | 3900 | 710 | 4050 | 740 | 3820 | 720 |
| 10 | 3230 | 636 | 3820 | 670 | 3770 | 683 |
| 15 | 3560 | 653 | 3840 | 663 | 3830 | 676 |
| 22 | 3270 | 643 | 3760 | 670 | 3420 | 676 |

These figures show improved tensiles for stocks B and C over stock A in which a basic amine was employed instead of the neutral salt, and also show the widening of the range of uniform tensiles known as the "plateau effect" for stocks B and C, which effect is desirable since it obviates the hazards and danger of overcuring.

The stocks were also subjected to 5 pounds steam pressure per sq. inch for various time intervals to proximate the maximum temperature reached during operations preliminary and prior to the usual actual vulcanization stage. The results in tensile-enlongation properties were as follows and indicate the comparative anti-scorching effects.

| Cure interval | A | | B | | C | |
|---|---|---|---|---|---|---|
| | T | E | T | E | T | E |
| Minutes | | | | | | |
| 25 | 593 | 893 | No cure | | No cure | |
| 30 | 922 | 850 | 407 | 900 | No cure | |
| 35 | 1,812 | 810 | 1,312 | 842 | 442 | 915 |
| 45 | 2,437 | 796 | 2,147 | 847 | 1,210 | 890 |

This definitely shows how minimum vulcanization is obtained with stocks B and C as compared with stock A, and how stocks B and C prepared according to this invention are less liable to premature vulcanization or scorching than stock A during preliminary processing or storage.

*Example 2.*—In this case stocks similar to A and B above were prepared with the exception that no stearic acid was used and instead of using 0.5 part of a dinitrophenyl ester of mercaptobenzothiazole there was used 0.75 part of an accelerating aldehyde-amine condensation product, i. e. butyr-aldehyde-aniline condensation product. The stocks are named respectively D and E and the tensile-elongation properties were as follows:

| Curing conditions (*Mins. at 60 lbs. steam*) | D | | E | |
|---|---|---|---|---|
| | T | E | T | E |
| 7 | 3790 | 723 | 3780 | 723 |
| 10 | 3880 | 700 | 3960 | 700 |
| 15 | 3580 | 670 | 3540 | 656 |
| 22 | 3240 | 650 | 3300 | 653 |

Comparative scorching tendencies are shown as follows:

| (*Mins. at 5 lbs. steam*) | D | | E | |
|---|---|---|---|---|
| | T | E | T | E |
| 20 | 737 | 893 | No cure | |
| 25 | 876 | 906 | No cure | |
| 30 | 1137 | 882 | 276 | 826 |
| 35 | 1380 | 822 | 295 | 830 |
| 45 | 1952 | 837 | 530 | 845 |

The comparative safety from prevulcanization, in activating an aldehyde amine type of accelerator with a basic organic amine when the latter is treated according to the present invention, is apparent from the above results.

The above results definitely and clearly show the improvement of using certain salts of "activating" basic amines, in lieu of the basic amines per se, when the former are blended or used with organic accelerators, to substantially avoid the scorching hazards attendant the prior use of the latter during the preliminary operations of processing rubber before final vulcanization of the rubber.

*Example 3.*—In this case stocks similar to A, B, and C above were prepared with the exception that no stearic acid was used and instead of using 0.5 part of a dinitrophenyl ester of mercaptobenzothiazole there was used 0.375 part of an activatable aldehyde-amine condensation product, i. e., heptaldehyde-aniline condensation product and further instead of using 0.75 part of diphenylguanidine, 0.965 part of diphenylguanidine-acetate, and 0.915 part of diphenylguanidine there were used 0.55 part of diorthotolylguanidine, 0.69 part of diorthotolylguanidine-acetate, and 0.66 part of diorthotolylguanidine-formate respectively in stocks H, I, and J. The tensile properties were as follows:

| Curing conditions (*Mins. at 60 lbs. steam*) | H | | I | | J | |
|---|---|---|---|---|---|---|
| | T | E | T | E | T | E |
| 5 | 3020 | 693 | 3450 | 730 | 3230 | 656 |
| 7 | 3240 | 653 | 3190 | 656 | 3900 | 700 |
| 10 | 3530 | 676 | 3840 | 683 | 3660 | 663 |
| 15 | 2880 | 663 | 3230 | 630 | 3450 | 665 |
| 22 | 3160 | 660 | 3230 | 633 | 3240 | 643 |
| 30 | 2810 | 666 | 3150 | 656 | 2840 | 630 |

The above figures clearly show that stocks I and J are fully equal in curing rate to stock H.

Comparative scorching tendencies are shown as follows:

| Curing conditions (Mins. at 5 lbs. steam) | H | | I | | J | |
|---|---|---|---|---|---|---|
| | T | E | T | E | T | E |
| 15 | No cure | | No cure | | No cure | |
| 20 | 660 | 966 | No cure | | No cure | |
| 25 | 1060 | 912 | 200 | 917 | No cure | |
| 30 | 1182 | 902 | 720 | 935 | 550 | 886 |
| 35 | 1373 | 906 | 940 | 913 | 883 | 913 |
| 40 | 1576 | 903 | 1125 | 890 | 1067 | 880 |

The wide margin of safety afforded during preliminary processing of stocks containing unusually active accelerator combinations may again be seen from the above results.

*Example 4.*—A stock K similar to A above was prepared with the exception that instead of 0.5 part of dinitrophenyl mercaptobenzothiazole there was employed 0.375 part of mercaptobenzothiazole (hydrogen benzothiazyl sulphide).

A stock L was prepared similar to stock K with the exception that instead of employing 0.75 part of diphenylguanidine there was incorporated 0.91 part of the normal salt diphenylguanidine oxalate.

A stock M was prepared similar to stock K with the exception that instead of employing 0.75 part of diphenylguanidine there was incorporated 0.55 part of diorthotolylguanidine.

A stock N was prepared similar to stock M with the exception that instead of employing 0.55 part of diorthotolylguanidine there was incorporated 0.66 part of the normal salt diorthotolylguanidine oxalate.

The tensile properties obtained were as follows:

| Curing conditions (Mins. at 60 lbs. steam) | K | | L | | M | | N | |
|---|---|---|---|---|---|---|---|---|
| | T | E | T | E | T | E | T | E |
| 5 | 4220 | 753 | 2250 | 720 | 3660 | 746 | 3330 | 756 |
| 7 | 3980 | 740 | 3130 | 743 | 4130 | 730 | 3780 | 743 |
| 10 | 3830 | 713 | 3450 | 733 | 3970 | 700 | 3720 | 700 |
| 15 | 3670 | 700 | 3570 | 750 | 3750 | 686 | 3670 | 723 |
| 22 | 3630 | 720 | 3220 | 700 | 3630 | 696 | 3540 | 713 |
| 30 | 3380 | 706 | 3170 | 750 | 3060 | 680 | 3500 | 695 |

The comparative scorching tendencies are shown as follows:

| Curing conditions (Mins. at 5 lbs. steam) | K | | L | | M | | N | |
|---|---|---|---|---|---|---|---|---|
| | T | E | T | E | T | E | T | E |
| 10 | 1613 | 880 | No cure | | 277 | 646 | No cure | |
| 15 | 2130 | 913 | No cure | | 1670 | 950 | No cure | |
| 20 | 2922 | 862 | No cure | | 2055 | 900 | 845 | 890 |
| 30 | 3502 | 850 | No cure | | 3023 | 883 | 2263 | 853 |
| 40 | 3923 | 796 | 1590 | 820 | 3636 | 846 | 3207 | 812 |
| 50 | 4036 | 780 | 2480 | 842 | 3920 | 807 | 4013 | 813 |

The above results illustrate how the invention may be used to control and render safe combinations of activated accelerators which previously could not be handled in ordinary factory processes and without the disadvantages of retarding rate of cure sufficiently at elevated vulcanizing temperatures to be uneconomic or impractical.

It should be readily apparent from the foregoing results to those skilled in the art that to obtain maximum efficiency in practicing this invention that weak accelerators require strong amines to activate while strong accelerators require weak amines and finally that the stronger acids should be used when the accelerator combination consists of both a strong accelerator and a strong activating basic organic amine. Variation in certain combinations of accelerators made apparent by this statement are within the disclosure of this invention and are so claimed.

The rubber treated may be in the form of latex or that coagulated therefrom as occasion requires, for example one may desire to compound the latex and afterwards extrude the compounded latex. Or the rubber may be in the form of an artificial aqueous dispersion of a previously coagulated rubber (crude or reclaim) with or without compounding ingredients before subjection to commercial processes of manufacturing vulcanized rubber goods.

The expression "activatable type of organic accelerator" as used in the claims is defined to mean those organic accelerators which respond to activation by basic organic amines during final vulcanization.

With the detailed description given above, it will be obvious that modifications will suggest themselves without departing from the principle of the invention, for example other compounding ingredients to include the usual antioxidants, softeners, pigments, etc. may be used instead of those specifically described in the examples, and it is not desired to limit the invention otherwise than as set forth in the appended claims.

Having thus described my invention, what I claim and desire to protect by Letters Patent is:

1. A process of producing vulcanized rubber which comprises incorporating with rubber a vulcanizing agent, an activatable type of organic accelerator and a substantially neutral salt of a diaryl guanidine and vulcanizing the rubber.

2. A process of producing vulcanized rubber which comprises incorporating with rubber a vulcanizing agent, an activatable type of organic accelerator and an organic salt of an aryl substituted guanidine and vulcanizing the rubber.

3. A process of producing vulcanized rubber which comprises incorporating with rubber a vulcanizing agent, an activatable type of organic accelerator, and a salt of an aryl substituted guanidine and vulcanizing the rubber.

4. A process of producing vulcanized rubber which comprises incorporating with rubber a vulcanizing agent, a mercaptobenzothiazole accelerator and a preformed substantially neutral salt of an aryl substituted guanidine and vulcanizing the rubber.

5. A process of producing vulcanized rubber which comprises incorporating with rubber a vulcanizing agent, a benzothiazyl sulphide accelerator and a preformed substantially neutral organic salt of a diaryl guanidine and vulcanizing the rubber.

6. A process of producing vulcanized rubber which comprises incorporating with rubber a vulcanizing agent, 2,4-dinitrophenyl ester of mercaptobenzothiazole and a preformed substantially neutral salt formed from the reaction of diphenylguanidine and acetic acid, and vulcanizing the rubber.

7. The process of vulcanizing rubber which comprises heating a mixture of rubber and sulfur in the presence of a salt of a phenyl substitute guanidine and in addition thereto a mercaptothiazole accelerator.

8. The process of vulcanizing rubber which comprises heating a mixture of rubber and sulfur in the presence of an organic salt of diphenylguanidine and in addition thereto a mercaptothiazole accelerator.

9. The process of making a vulcanized rubber product which comprises mixing a vulcanizable rubber composition with a thiazyl sulphide accelerator and a salt of an aryl substituted guanidine and vulcanizing the rubber.

10. The process of making a vulcanized rubber product which comprises mixing a vulcanizable rubber composition with a thiazyl sulphide accelerator and an organic salt of a diaryl guanidine and vulcanizing the rubber.

11. A rubber composition comprising prior to vulcanization an activatable type of organic accelerator, and a salt of an aryl substituted guanidine.

12. A rubber product which is the vulcanization product of a rubber composition comprising a vulcanizing agent, an activatable type of organic accelerator, and a salt of an aryl substituted guanidine.

13. A rubber product which is the vulcanization product of a rubber composition comprising a vulcanizing agent, an activatable type of organic accelerator, and an organic salt of an aryl substituted guanidine.

HENRY O. NEWMAN.